United States Patent

Hufe, Jr.

[11] Patent Number: 6,126,175
[45] Date of Patent: Oct. 3, 2000

[54] COLLET-STOP ASSEMBLY

[76] Inventor: Warren E. Hufe, Jr., 3475 Wells Ave., Southold, N.Y. 11971

[21] Appl. No.: 09/122,860
[22] Filed: Jul. 27, 1998
[51] Int. Cl.[7] .................................................... B23B 13/12
[52] U.S. Cl. ............................ 279/156; 279/87; 403/369
[58] Field of Search ........................ 279/156, 87; 82/155; 403/368–371

[56] References Cited

U.S. PATENT DOCUMENTS

| | | | |
|---|---|---|---|
| 2,789,826 | 4/1957 | Procter | 279/87 |
| 4,262,916 | 4/1981 | Tykwinski | 279/156 |
| 4,955,622 | 9/1990 | Peterson | 279/156 |
| 5,474,308 | 12/1995 | Moser | 279/156 |
| 5,647,685 | 7/1997 | Fukui et al. | 403/370 |
| 5,772,219 | 6/1998 | Vossen | 279/156 |

*Primary Examiner*—Steven C. Bishop
*Attorney, Agent, or Firm*—Thomas L. Bohan and Associates; Thomas L. Bohan

[57] ABSTRACT

A collet-stop assembly for fixing the position of a workpiece or tool ("item") intended to be held immobile by and within a collet during machining operations. The assembly includes a stop-collar for gripping a stop-unit to be placed in direct contact with the item, and a collar-retainer used ensure that the stop-unit is held immobile with respect to the collet. The collar-retainer is screwed into the collet and includes a tapered section into which a tapered section of the stop-collar is drawn. In the Preferred Embodiment of the invention the stop-collar is formed of three separate jaws that when drawn into the collar-retainer by means of cap screws passing through the collar-retainer squeeze against the stop-unit. The basic collar-retainer design permits it to be manufactured so that the distances it extends, respectively, to the outside of the collet and down into the collet are very short; that is, it has small external and internal profiles. All manipulations of the assembly are done at one end of the collar-retainer and require only a single tool to complete. In the Preferred Embodiment, this tool is a small-gauge Allen key used to tighten the cap screws. The device simplicity depends in part on the cap-screw-tightening action resulting in rotational immobility of the stop-unit and work-piece with respect to the collet, even though the collet-stop assembly is made only finger-tight prior to the cap-screw-tightening.

20 Claims, 4 Drawing Sheets

COLLET-STOP ASSEMBLY

BACKGROUND OF THE INVENTION

1. Field of the Invention

The present invention relates to a device for positioning machine tools and work-pieces used in various types of machining operations. In particular, the present invention relates to a collet-stop assembly used with a collet to fix the position of the machine-tool or work-piece within a lathe, a milling machine, or similar machining equipment. More particularly, the collet-stop assembly of the present invention provides greater ease of set-up, while being considerably smaller than the collet stops hitherto available. Still more particularly, the greater ease of use of the collet-stop assembly of the present invention comes from the minimal number of tools that are needed to install it in a collet, and the very small extension of the collet-stop assembly inside and outside of the collet

2. Description of the Prior Art

Lathes, screw machines, milling machines, and the like universally use collets in many stages of their operation, the collets serving to grip machine tools and work-pieces ("work-items") during machining operations and to properly present them to the point of cutting. The collet is intended to firmly lock the work-items in place during the machining operation, which in general involves rapid spinning of the work-item and/or the application of significant torque to it.

Work-items come in widely varying sizes and shapes, whereas the machines are limited to a relatively small number of sizes and, because of their expense, are even more limited in size within a given shop. The consequent disparity between work-item size and shape, on the one hand, and the dimensions of the work-item-accepting openings of the machines, on the other, is partially overcome by supplementing the collets with a "collet-stop," to be referred to as a "collet-stop assembly" in this discussion. The collet-stop assembly contains a stop-unit, a rod- or tube-like element that is placed along the axis of the collet and that, by virtue of having a flat terminus at its end closer to the "front" of the collet, provides a platform against which the work-piece or tool may be butted. The position of this stop-unit is moved proximally or distally to accommodate work-items of various sizes, ensuring that the proper portion of the item is brought into the zone of work. ("Proximal" refers to the direction along the collet axis toward the front of the collet; "distal" refers to the opposite direction, that is, away from the front—toward the back—of the collet.)

The use of a collet-stop is particularly important when a large number of work-pieces are to be machined and it is necessary to quickly move pieces in and out of the collet while ensuring that the part of each individual work-piece presented to the machining point is unchanged in spite of the removal of one work-piece and the insertion of another. This application puts a premium on the constancy of the stop-unit location in the presence of the stresses imposed by the operation of the machines in question.

A premium is also placed on the ease of adjustment of the stop-unit location. This is important under the opposite of the circumstance just described. That is, when a sequence of work-items of varying sizes must be mounted for machining, one wishes to be able to move the stop-unit proximally and distally simply and dependably while using a minimal number of tools.

Currently available collet-stop assemblies are deficient with respect to both of the characteristics just listed, that is, with respect to dependability of the stop-unit position with time and with respect to the ease of adjusting the stop-unit position. The oldest—and still most common—type of collet-stop assembly uses a stop-unit that is threaded into a sleeve, the sleeve and associated parts of the collet-stop assembly then being affixed to the back of the collet, generally by being threaded tightly into the back of the collet. This threaded stop-unit is moved distally or proximally by rotating it with respect to the sleeve. When it reaches the proper position it is secured against further rotation by tightening one or more lock nuts co-axial with the sleeve and the stop-unit. This design has several major flaws, the most serious being present even when the collet-stop assembly is built to the tightest of specifications. For example, the number of tools one must have available and use is burdensome, starting with the necessity of tightening the assembly to the collet with a wrench to ensure that it does not back off (unscrew) from the collet while the machine is in operation, shifting the stop-unit distally. Then, when one needs to change the stop-unit position it is necessary to hold the collet-stop assembly so that it does not unscrew while the lock-nut is being unscrewed, another wrench or similar device being needed on the lock-nut itself. Then, after rotating the stop-unit so as to advance or retract it, the operator must use a wrench to again tighten the lock-nut.

A separate but related drawback to this common prior-art device is the distance that it extends out the back of the collet, a distance referred to as its "external profile." Not all modern machines have collet-accepting-and-gripping turrets or the like capable of accepting the large external profile that is inherent in this collet-stop assembly's design. (The most common placement will be in a spindle or turret holder of a lathe or similar rotary machining equipment (not shown); however the assemblage will also be used in connection with milling machines, where the collet will be oriented vertically on the machine table, instead of horizontally as with a lathe. In whichever position it is used, it is beneficial that the collet-stop assembly occupy a relatively small distance longitudinally within the collet.) It is inherent because this prior-art design requires that that portion of the assembly external to the collet must provide the means to loosen and tighten one or more lock-nuts and to tighten the assembly onto the collet.

In addition to the drawbacks inherent in this common prior-art design, the fact that it uses threaded stop-units makes it also vulnerable to a common type of manufacturing defect. If the threads on the stop-unit are not concentric with the axis of the collet-gripping means of the machine, misalignment of the work-piece or machine-tool—and consequent failure of the machined piece to meet specs—can occur. The same result follows from another common manufacturing defect: the failure of the lock-nut that is used to secure the threaded stop-unit within the collet to be squared off exactly at its face. Furthermore, if the lock-nut is not squared off at its face but is square to the threading of the stop-unit, the stop-unit will be pulled to one side within the collet as that lock-nut is tightened.

Some of the problems associated with the above-described prior art can be resolved by replacing the threaded stop-unit with one that has a smooth, circular external wall. Prior-art collet-stop assemblies do exist that use this approach. These include, for example, the collet-stop assembly of Peterson (U.S. Pat. No. 5,050,896), which uses a smooth rod as its stop-unit and a single set-screw that impinges the stop-unit essentially perpendicularly to its axis as the means to hold the stop-unit in place. Unfortunately, the single set-screw has a tendency to loosen, allowing the (unthreaded) stop-unit to move axially—an unacceptable situation with the high-speed, rotating machining equipment. Moreover, and as is well-known, set-screws tend to cause a scoring or imprinting of the surface of the rod that they are intended to hold in place. In the present context, where the stop- unit tends to be set at a number of nearby positions, the result is that the set-screw may be screwed onto the stop-unit rod's surface at a point partially overlapping an imprint made by an earlier "setting." Subsequently, the rod's prior imprint may "jump" into or away from the current set-screw position, moving the stop-unit and work-item in the midst of the machining operation. The single-set-screw approach presents a further problem in that it tends to push the stop-unit to one side, offsetting the work-piece. This clearly affects the degree of precision for which the machine can be counted on.

In order to avoid having to screw the collet-stop assembly onto the collet, some prior-art devices include a retaining sleeve on the shaft of the assembly, a sleeve that squeezes outward forming a pressure contact with the inner wall of the collet, thus serving to immobilize the assembly with respect to the collet. Typically these sleeves are made of a flexible material, which is undesirable in applications where the goal is to machine pieces to extremely tight tolerances, since it can easily lead to a loosening of the assembly or in movement of the collar-stop and thus the work-piece. Furthermore, under machining conditions it is common for metal chips to be dispersed throughout the equipment, including the collets. When these metal chips become embedded in the relatively soft non-metallic sleeve materials, they render such sleeves useless in later operations.

Apart from everything else, a near-universal problem with prior-stop devices is their sheer complexity. Even disregarding set-up inconvenience one must be concerned because of the increase in cumulative work-piece positioning error associated with the collet-stop assembly being formed of a large number of components. Furthermore, and as alluded to above, the plurality of attachment mechanisms, a plurality that may be distributed among several locations on the prior-art collet-stop assemblies slows the machining operation and increases the likelihood that one of the attachment mechanisms is not completely secured.

Therefore, what is needed is a simple collet-stop assembly requiring minimal effort to affix it to a collet so as to ensure that its stop-unit is held firmly in place with respect to the collet during machining operations. What is further needed is such a collet-stop assembly that also requires minimal effort when the operator needs to adjust the stop-unit location. What is yet further needed is such a collet-stop assembly that contains a minimal number of separate parts, one that does not use a threaded stop-unit, flexible means for coupling to the collet, or any means for coupling to the collet that would put uneven stress on the collet or the collet-stop assembly itself. Finally, what is needed is such a collet-stop assembly that has smaller external and internal profiles than the prior art devices and yet is fully compatible with presently-existing, commonly-used collet assemblies.

SUMMARY OF THE INVENTION

It is an object of the present invention to provide a collet-stop assembly that is simpler to mount than are the existing collet-stops. It is a further object of the present invention to provide such a collet-stop assembly that provides an easier means of adjusting the axial location of the stop-unit. It is a yet further object of the present invention to provide such a collet-stop assembly that maintains the position of the stop-unit to at least as dependably as do the existing collet-stops, while containing fewer key components. It is a still further object of the present invention to provide such a collet-stop assembly that has smaller internal and external profiles than the existing collet-stops while being fully compatible with presently-existing, commonly-used collet assemblies.

These and other objectives are achieved by the present invention through its novel collet-stop assembly that can nevertheless be utilized in conventional collet assemblies such as the "5C" collets manufactured by the Hardinge Company. The heart of the collet-stop assembly of the present invention is its stop-collar/collar-retainer combination. The collar-retainer is couplable into the end of a standard collet without the use of tools, that is, without the need to tighten it into the collet with a wrench, as the most common prior-art collet-stops require. When the collar-retainer is coupled to the stop-collar so as to rigidly fix the location of the associated stop-unit, a collateral effect is to ensure that the collar-retainer is rotationally fixed with respect to the collet. The stop-collar and the collar-retainer have mated, axially-centered throughbores within which the stop-unit is secured. The axial position of the stop-unit within the stop-collar can be adjusted so that the stop-unit can ensure that the work-piece or tool being used in a particular machining operation extends the correct distance out from the collet's proximal end. The beauty of the collet-stop assembly of the present invention is that it can be completely installed using no more that one's fingers and one simple tool, such as an Allen key.

There are several alternative sequences of steps through which the collar-retainer/stop-collar/stop-unit combination of the present invention can be coupled together and secured to a collet. One of these sequences, used with a standard 5C collet, is as follows. First, the stop-collar is coupled loosely to the inside of the collar-retainer and the collar-retainer threaded finger-tight into the collet's distal end, the collar-retainer having been externally threaded for this purpose. The stop-unit is then inserted through the stop-collar—which has an internal surface with a roughly circular cross-section—and moved to its desired position, that is, the position where its proximal end is the desired distance from the proximal end of the collet. After the stop-unit is in its desired location, the stop-collar is tightened around it to prevent further axial motion with respect to the collar-retainer. This tightening of the stop-collar is effected by the use of collar-securing means located at the distal face of the collar-retainer. The materials and designs used for the stop-collar and the collar-retainer are such that once the stop-collar is firmly attached, the collar-retainer—and hence the entire collet-stop assembly—is tightly coupled to the collet. By this it is meant that at this point great effort must be exerted to unscrew the collar-retainer from the collet even though it had just been finger-tightened. This enhanced tightening arises during the stop-collar-retaining step, the minor warping of the collar-retainer flange being enough to prevent the collar-retainer from being loosened from the collet.

Once the collet-stop assembly is installed in the collet as described above, it is generally not removed. Subsequent adjustments of the axial position of the stop-unit are made with the assembly in place. To make such adjustments, the stop-collar is loosened by loosening the stop-collar-securing-means referenced above. The stop-unit can then be slipped through the stop-collar to its desired position, after which the stop-collar-securing means are again tightened.

The stop-collar-securing means, along with the design of the stop-collar and the collar-retainer, ensure that the stop-unit will remain firmly in place throughout the machining operation, and without applying stress to the collet that could cause its dimensions to be forced out of tolerance.

The stop-collar of the present invention is formed of a plurality of independent "jaws" that, when coupled to the collar-retainer, create a cylindrical clamping surface around the cylindrical stop-unit. The jaws are sized and arranged to ensure that, as they are tightened against the collar-retainer, a gap always remains between adjacent jaws. As each jaw is tightened to the retainer, it is pulled into the retainer, closer to—but never reaching—a transverse inner face of the collar-retainer.

It is important to note that the jaws of the stop-collar are coupled to the collar-retainer and thus kept in position through the use of very simple attachment means. As the collar-retainer keeps the jaws locked in position, it itself is fixed in place by the resistance that its banking face presents to slipping across the distal end of the collet, against which that banking face is butted. This is a distinct design advantage over the prior art devices where the retainer is either wrench-locked in place by threading it over the collet, or by squeezing a flexible (generally plastic) sleeve out against the inner wall of the collet. Further, through the design described herein, the present invention can be employed to take full advantage of the capacity of the particular collet to which it is affixed. Prior-art devices generally occupy so much of the collet's interior space that they present versatility-limiting constraints.

The stop-collar collar-retainer combination described above alleviates the problems associated with the cited prior-art collet-stop assemblies, especially in those built around threaded stop-units. Moreover, it also avoids those problems associated with unbalanced means—such as set screws—of coupling to the stop-unit encountered in prior-art devices that use smooth stop-units. In the present invention, a relatively large exterior area of the stop-unit is firmly gripped by the stop-collar.

Furthermore, the collet-stop assembly of the present invention is much simpler than the prior-art collet-stop assemblies. In contrast with those devices, the present one has only two major components (not including the stop-unit, which is required in all cases): the stop-collar and the collar-retainer. Further, the components of the assembly are fixed in their respective positions by screwing the collar-retainer into the collet and then tightening the stop-collar to the collar-retainer, with both operations being carried out at the distal end of the collet. It is also to be noted that the collet-stop assembly of the present invention protrudes beyond the distal end of the collet by only the thickness of the flange of the collar-retainer. (The distal side of this flange consists of the distal face mentioned above. The proximal side of the flange consists of a retainer banking face that butts up against the distal end of the collet.) In the Preferred Embodiment of the invention the flange is only 3/16" thick, resulting in an external profile that is much less than those of the prior-art devices.

In some of the present invention's applications, the diameters of the work-pieces vary over a sizeable range. Such applications can benefit from the use of a stop-unit with two or more pieces. To avoid the complication of having to frequently replace the stop-unit with one of a different diameter, the present invention is well suited to the use of a compound stop-unit consisting of a master stop tube that resides in the collet-stop assembly, and a set of adaptive stop tubes, each with a different end appearance. Thus when the flow of work results in a series of work-pieces of greater or lesser diameter than those previously used, it is only necessary to detach the adaptive stop tube hitherto in use and replace it with one adapted to the diameter of the new series. The master stop tube is preferably internally threaded in order to mate with an externally-threaded adaptive tube. While the term tube is ordinarily associated with a hollowed cylinder, it is to be understood that in the context of the present invention, the stop tube may be solid, it may have a hole completely therethrough, or it may be partially hollowed. Preferably the mating threads will be pipe threads for the stable coupling benefits they impart.

The advantages of the present invention set out above, as well as others not stated explicitly, will become apparent upon review of the detailed description of the Preferred Embodiment, the accompanying drawings, and the claims. Although some specificity has been used for definiteness in the configurations alluded to in this SUMMARY OF THE INVENTION, other configurations will be readily apparent to those skilled in the art, in particular in machine shop technology. Failure to list those configuration is not intended to exclude any such configurations from the invention being disclosed and claimed herein.

DETAILED DESCRIPTION OF THE PREFERRED EMBODIMENT

Figure 1A:
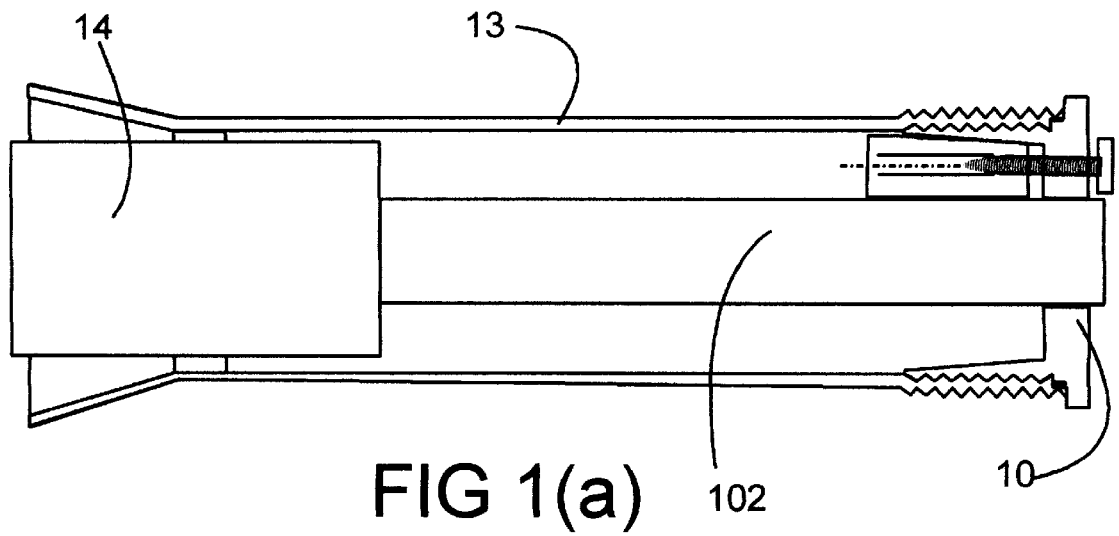
FIG. 1(a) shows a cut-away view of the collet-stop assembly of the present invention as it resides in a standard collet.
Figure 1B:
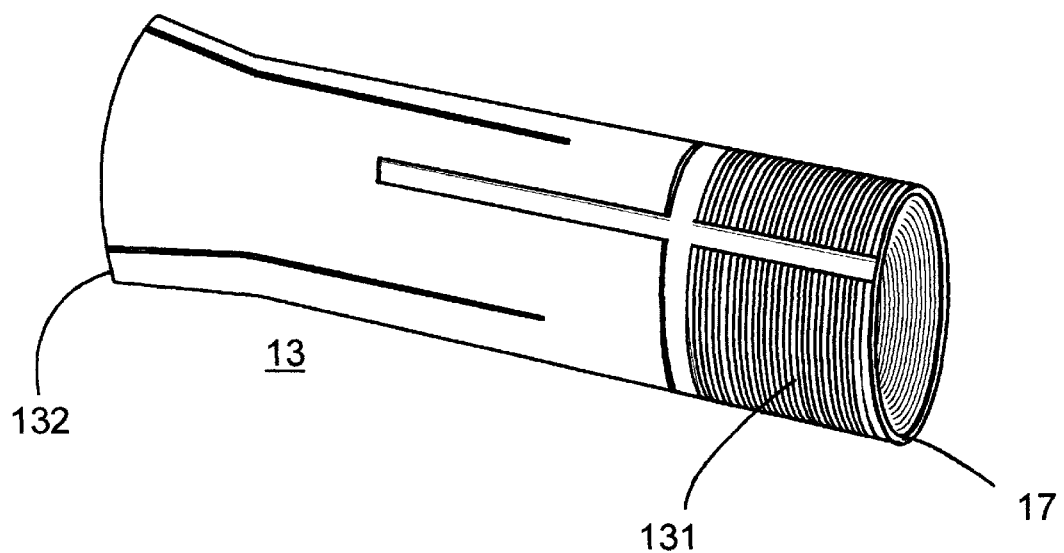
FIG. 1(b) shows a perspective view of a standard prior-art collet.
Figure 2:
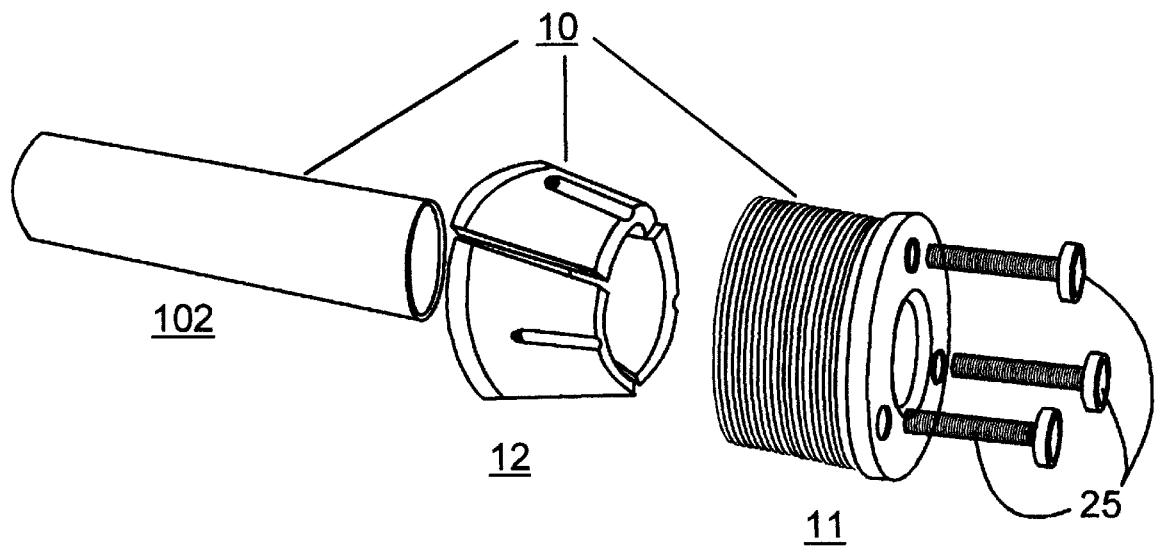
FIG. 2 shows an "exploded" view of the collet-stop assembly in accordance with the Preferred Embodiment of the present invention.

FIG. 1(a) shows a section through a standard collet 13 in which resides a collet-stop assembly 10 according to the Preferred Embodiment of the present invention. The collet 13 as shown in FIG. 1(b) is defined to have a distal end 131 and a proximal end 132. FIG. 2 shows in perspective an exploded view of the collet-stop assembly 10, including a collar-retainer 11 and a multi-piece stop-collar 12 made up of a plurality of individual segments 20. It is to be understood that the collet-stop assembly 10 conforming to the Preferred Embodiment of the present invention may be adapted to fit a variety of collet types and that the particular collet 13 shown in FIG. 1(a), FIG. 1(b), is used only for definiteness of illustration.

With continuing reference to FIG. 1(a) and FIG. 2, it is noted that the colletstop assembly 10 is used to provide backing support to a tool or work-piece (shown generally as the piece 14 in FIG. 1(a)) during machining operations. The collet-stop assembly 10 incorporates a stop-unit 102, the entity that comes into direct contact with the piece 14. When mounted for machining work, the collet 13 (containing the collet-stop assembly 10 and the piece 14) will have been fixed in position so that the piece 14 is immobilized by the collet 13. The collet-stop assembly 10, in particular the stop-unit 102, is used to ensure that the work piece 14 extends the proper distance beyond the proximal end 132 of the collet 13. The work pieces and work environments in which collets and collet-stop assemblies are used vary greatly in both size and shape. In order to maximize the range of work pieces and of work environments within which it can be used, it is important that the collet-stop assembly 10 present a minimal internal profile 112 and a minimal external profile 111 each such profile illustrated in FIG. 3.

Figure 3A:
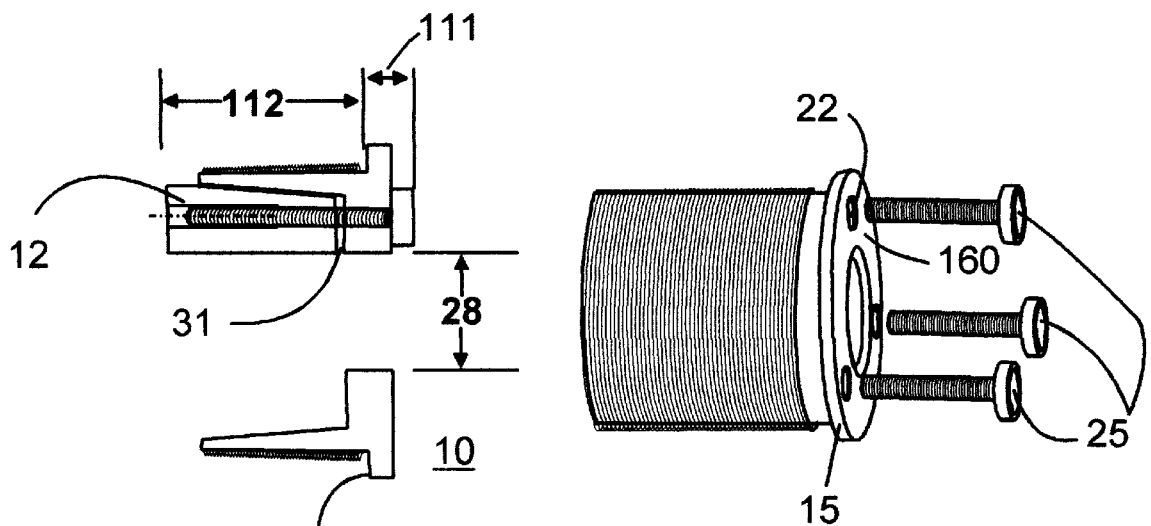
FIG. 3(a) shows perspective and cutaway views of the collar-retainer.
Figure 3B:
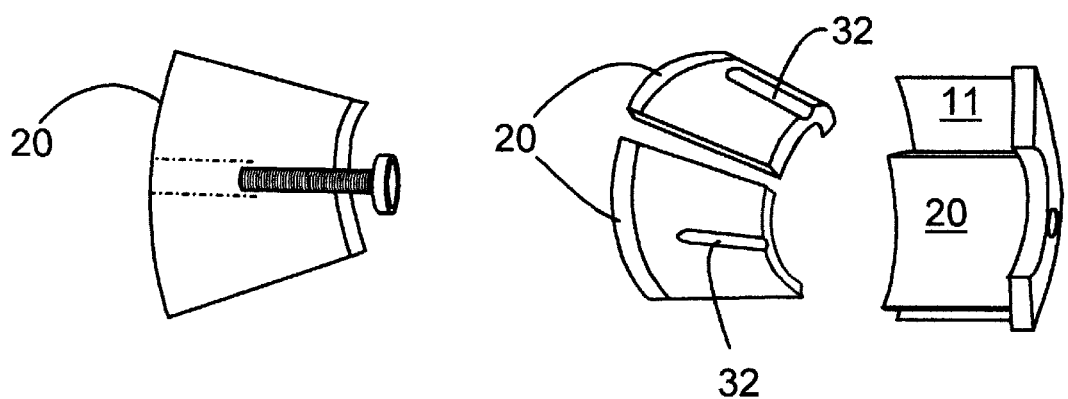
FIG. 3(b) shows an exploded view of the stop-collar and portion of the collar retainer.

With reference to FIG. 2 and FIG. 3(a) and FIG. 3(b), it can be seen that the collar-retainer 11 includes a flange 15 that manifests a distal flange face 160 and a proximal flange face 16. (These correspond, respectively, to the "distal face" and "retainer banking face" referenced in the SUMMARY.) The flange 15 has a diameter equal to or slightly greater than that of the collet 13 to which the collar-retainer 11 is to be attached. The proximal flange face 16 butts up against a banking end 17 of the collet 13 when the collet-stop assembly 10 is in place, as shown in FIG. 1. In the Preferred Embodiment of the present invention, the collar-retainer 11 is threaded externally to match the internal threads of the collet 13 so that the collar-retainer 11 may be screwed into the collet 13 in order to attach the collet-stop assembly 10 to the collet 13. It is to be noted that this coupling of the collar-retainer 11 and the collet 13 is simply designed to ensure that the proximal flange face 16 and banking end 17 are brought together when screwed in by the operator's fingers. There is no need in the device of the present invention to use a wrench or other tool to couple the collar-retainer 11 to the collet 13.

To the extent that the collet-stop assembly 10, once threaded all the way into the collet 13, is prevented from rotating the other way with respect to the collet 13, it is the resistance of the proximal flange face 16 against slippage across the banking end 17 that prevents this rotation. As will be discussed below, in the present invention this resistance is very great once the collet-stop assembly 10 is in place and the stop-unit 102 held immobile with respect to the collar-retainer 11.

In the Preferred Embodiment, the threading of the collar-retainer 11 into the collet 13 is facilitated by a plurality of cap screws 25 that extend distally from the collar-retainer 11, as can be seen to varying degrees in FIG. 1, FIG. 2 and FIG. 3(a) and FIG. (3b). The heads of the cap screws 25 give the operator's fingers something with which to grip the collar-retainer.

In order to minimize the external profile 111 of the collet-stop assembly 10, the flange 15 is thin. In the Preferred Embodiment of the invention, the flange 15 has a thickness of only about 3/16". The heads of the cap screws 25 in the Preferred Embodiment slightly increase the external profile 111. If this increase in overall thickness is a problem, alternative configurations are readily foreseeable, such as one where the holes in the collar-retainer 11 through which the cap screws 25 pass are countersunk. In this configuration, knurling the outer perimeter of the flange 15 can be used to compensate for the loss of the gripping capacity previously provided by the screw heads.

As can be seen in FIG. 2 and FIG. 3(b), the stop-collar 12 in the Preferred Embodiment includes three separate jaws 20 that are collectively joined to the collar-retainer 11 in order to make the collet-stop assembly 10 functional. The jaws 20 are coupled to the collar-retainer 11 by the cap screws 25 which pass through equally-spaced flange holes 22, and then into threaded holes 32 wherein one of the threaded holes 32 occurs in each of the jaws 20. As each of the cap screws 25 is tightened, the corresponding one of the jaws 20 is drawn into the collar-retainer 11, which is provided with an interior retainer wall 23 that is tapered. In the Preferred Embodiment, the interior retainer wall 23 has a 14° taper, with its inner diameter increasing proximally from the flange 15. Further, each of the individual jaws 20 is also tapered. In this way, as can be seen by referring again to FIG. 1 and FIGS. 3(a) and (3b), the jaws 20 mate with the collar-retainer 11 forming an inner stop-collar diameter 28 that progressively decreases as the stop-collar is drawn farther into the collar-retainer 11. When initially joined together and coupled to the stop-collar-retainer 11, the jaws 20 establish the inner stop-collar dimension 28 to be substantially the same as the diameter of the throughbore of the collar-retainer 11. In this configuration, the stop-unit 102 can be easily inserted into the throughbore of the collar-retainer 11. As the jaws 20 advance distally ever closer to (but never reaching) an inner transverse face 31 of the collar-retainer 11, the inner collar diameter 28 lessens, squeezing against the stop-unit 102 with a uniform pressure extending along the length of contact between the stop-collar 12 and the stop-unit 102, thereby holding the stop-unit 102 securely in place with respect to the collar-retainer 11. At this point, it will be found that the collar-retainer 11 is also rigidly held in place inside the collet 13, thus ensuring that the stop-unit 102 is held securely in place with respect to the collet 13, which is the ultimate objective.

To reiterate, the collet-stop assembly 10 described herein requires a machine operator to use only a single, small tool—that tool used to manipulate the cap screws, a 3/32" Allen key in the Prefered Embodiment—at just one end of the assembly in order to affix or to release the stop-unit 102. It is also noted that the throughbores of the assembly permit the machine operator to adjust the positioning of the stop-unit 102 as desired. This is particularly advantageous in minimizing the effective external profile 111 of the collet-stop assembly 10, since the stop-unit 102 may be set to a point recessed to below the surface of the flange 15 thereby reducing the external profile 111 to the thickness of the flange 15 alone or, at most, that thickness plus the height of the heads of the cap screws 25.

Although the collar-retainer 11 and the stop-collar 12 of the present invention can be fabricated in a variety of sizes so as to mate with a variety of collets, the collet-stop assembly 10 of the Preferred Embodiment, illustrated in the drawings, is intended to be utilized in a "5C" split-type collet of the type manufactured by the Hardinge company. It may be fabricated of steel, stainless steel, aluminum, and the like, but is preferably made of brass for its flexibility, non-magnetic nature, and ease of machining.

Figure 4A:
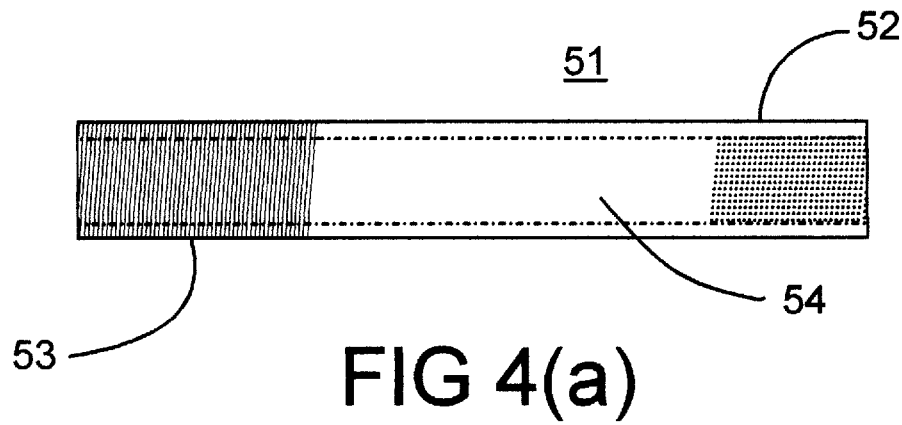
FIG. 4a is a top view of the master stop tube component of the stop-unit of the present invention.

An integral component of the present invention is the stop-unit 102, shown in FIG. 1(a) and FIG. 2 as a single cylindrical tube. Some increased versatility may be achieved by making the stop-unit 102 a compound structure. In such a case, the stop-unit 102 then contains, as illustrated in FIG. 4a, a master stop tube 51 having a proximal end 52 and a distal end 53, wherein the master stop tube 51 is fixed directly in the stop-collar 12. The master stop tube 51 may either be completely hollow, or it may be solid in an interior middle region 54. In the Preferred Embodiment, the proximal end 52 of the master stop tube 51 is internally threaded with a pipe tap in order to accept any one of a plurality of adaptive stop tubes bearing matching external pipe threads.

Figure 4B:
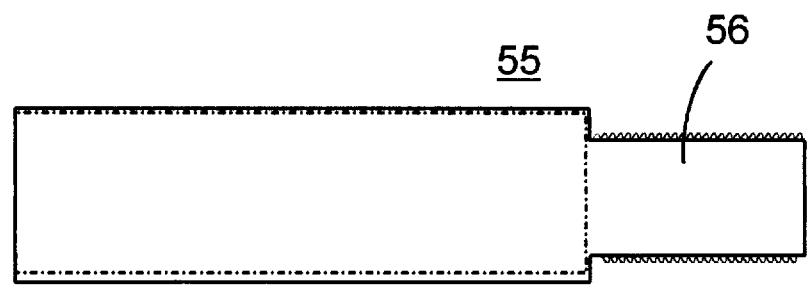
FIG. 4b is a top view of one form of adaptive stop tube component of the present invention.
Figure 4C:
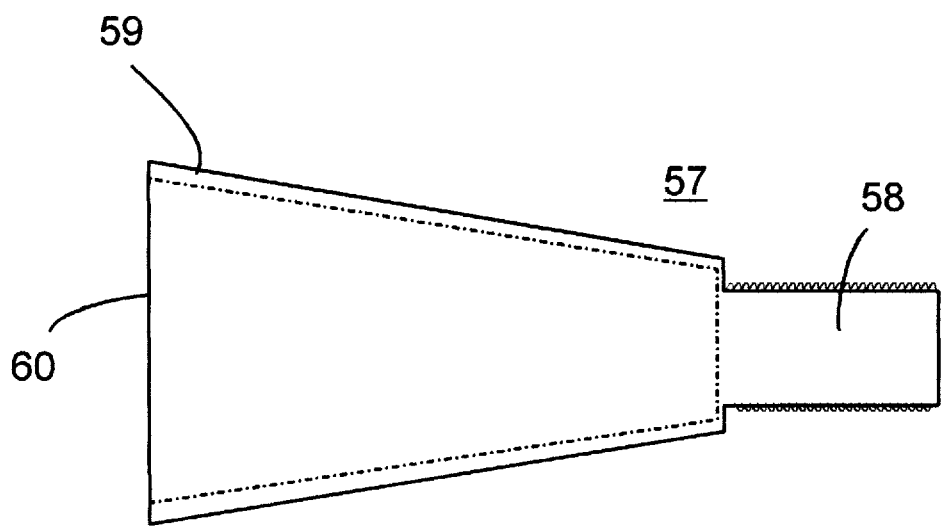
FIG. 4c is a top view of a second form of adaptive stop tube component of the present invention.

Examples of adaptive stop tubes are shown in FIG. 4b and FIG. 4c. In FIG. 4b, a first adaptive tube 55 is shown as a cylinder of substantially constant diameter and suitable for supporting a work-piece or tool such as the piece 14 shown in FIG. 1. The first adaptive tube 55, which may be hollow or solid, has an externally-pipe-threaded distal end 56 for mating with the proximal end 52 of the master stop tube 51. The presence of the pipe-threading ensures that the coupling between the adaptive stop tube and the master stop tube will not shift once the combination is under compression. A second adaptive tube 57, shown in FIG. 4c, has a tapered shape and is best suited for a work-piece or tool of larger diameter than those best-used with the first adaptive tube 55. The second adaptive tube 57 may also be hollow or solid, and is designed to have an externally threaded distal end 58 for attachment to the master stop tube 51, as well as a flared region 59, ending with a relatively wide base 60 forming a foundation for the work-piece 14 or a machining tool.

It is anticipated that the primary components of the present invention may be fabricated of a range of materials, including metals and plastics. In the Preferred Embodiment, the master stop tube 51 can fabricated of practically any metal including, but not limited to, aluminum, whereas the adaptive stop tubes 55 or 57, the collar-retainer 11, and the stop-collar 12 are all fabricated of brass as that material is easy to machine, is much lighter than steel, is relatively corrosion resistant, is non-magnetic, and requires no electroplating.

While the collet-stop assembly of the present invention has been described and illustrated with particular reference to specific components and configurations, it is to be understood that alterations in particular materials of construction, collar and retainer types, and assembly dimensions and configurations may be made without deviating from the basic attributes of the invention.

I claim:

1. A collet-stop assembly for positioning a work-piece within a collet by the use of a stop-unit, said assembly comprising a stop-collar and a collar-retainer, wherein said collar-retainer is couplable to a distal end of said collet and also to said stop-collar, and wherein said stop-unit can be held firmly in position within said collet by a stop-collar-tightening means and said collar-retainer can be held firmly in position with respect to said collet by a collar-retainer-tightening means, wherein all tightening adjustments to said collet-stop assembly are performable at a distal end of said collet-stop assembly and wherein said tightening adjustments are achievable with a single-sized wrench.

2. The collet-stop assembly as claimed in claim 1 wherein said stop-collar-tightening means comprises a squeezing inward of said stop-collar when a distal surface of said stop-collar is drawn toward a distal end of said collar-retainer.

3. The collet-stop assembly as claimed in claim 2 wherein said stop-collar-tightening means further comprises one or more retainer screws, wherein said one or more retainer screws pass through said collar-retainer and are threadable into one or more threaded retainer-screw holes in said stop-collar, whereby tightening of said screws draws said stop-collar towards said collar-retainer and causes said stop-collar to apply pressure upon said stop-unit.

4. The collet-stop assembly as claimed in claim 3 wherein a stop-collar-squeezing surface of said collar-retainer is tapered so as to be narrower at a distal end thereof than it is at a proximal end thereof, and wherein an exterior surface of said stop-collar is tapered matingly to said stop-collar-squeezing surface so as to be wider at a distal end thereof than it is at a proximal end thereof.

5. The collet-stop assembly as claimed in claim 4 wherein said stop-collar is formed of a plurality of jaws, said plurality of jaws having substantially equal dimensions, wherein an interior surface of said stop-collar is made up collectively of interior surfaces of said plurality of jaws, and wherein said interior surface forms a gripping surface of variable dimension about said stop-unit.

6. The collet-stop assembly as claimed in claim 5 wherein retainer-tightening is achieved by fabricating said collet-stop assembly parts such that said collar-retainer can be finger-tightened into said collet, yet be wrench-tightened into said collet following a wrench-tightening of said screws into said stop-collar.

7. The collet-stop assembly as claimed in claim 6 wherein said interior surface is cylindrical in shape.

8. The collet-stop assembly as claimed in claim 7 wherein each of said plurality of jaws contains one of said retainer-screw holes.

9. The collet-stop assembly as claimed in claim 8 wherein said collar-retainer and said jaws are fabricated of brass.

10. A collet-stop assembly for positioning a work-piece longitudinally within a collet to be mounted in a collet-holder of a rotary machine, said collet-stop assembly comprising:

a. a stop-unit against which the work-piece is to be butted,
b. a stop-collar for holding said stop-unit rigidly with respect to said stop-collar, wherein said stop-collar has an internal stop-unit-gripping surface,
c. a collar-retainer connectable to said stop-collar with collar-retaining means, and
d. means to rigidly couple said collar-retainer to said collet,
wherein all tightening adjustments to said collet-stop assembly are performable at a distal end of said collet-stop assembly with a single-sized wrench.

11. The collet-stop assembly as claimed in claim 10 wherein an interior surface of said collar-retainer has a retainer-taper and an exterior surface of said stop-collar has a collar-taper such that when said stop-collar is moved into said collar-retainer, said collar-retainer squeezes said stop-collar, thereby reducing in diameter said stop-unit-gripping surface.

12. The collet-stop assembly as claimed in claim 11 wherein said stop-collar is formed of a plurality of similarly-shaped jaws.

13. The collet-stop assembly as claimed in claim 12 wherein said stop-unit includes a master stop tube and an adaptive stop tube, wherein said adaptive stop tube is couplable to said master stop tube.

14. The collet-stop assembly as claimed in claim 13 wherein said master stop tube is a straight, hollow cylinder, with internal threading at a proximal end thereof.

15. The collet-stop assembly as claimed in claim 14 wherein said adaptive tube is a straight, solid rod with external threading complementary to said internal threading of said master stop tube.

16. The collet-stop assembly as claimed in claim 15 wherein said adaptive stop tube is a flared, solid cylinder.

17. A a single-sized-wrench method of positioning a workpiece in a collet securable to a rotary machine collet mount, said method comprising the steps of:

a) coupling a stop-collar to an interior surface of a collar-retainer;

b) threading said collar-retainer into a distal end of said collet;

c) inserting a distal end of a stop-unit into a through-hole in said stop-collar;

d) placing a distal end of said workpiece against a proximal end of a stop-unit;

e) tightening said stop-collar around said stop-unit by a collar-securing means; and f) securing said collet to said collet mount.

18. The method as claimed in claim 17, wherein said stop-unit includes a master stop tube and an adaptive stop-tube and wherein the step of placing said distal end of the workpiece against said proximal end of said stop-unit comprises the steps of:

a) coupling a proximal end of said master stop-unit to a distal end of said adaptive stop-tube; and b) positioning said distal end of the workpiece against a proximal end of said adaptive stop-tube.

19. The method as claimed in claim 17, further comprising the steps of:

a) loosening said collar-securing means;

b) adjusting the axial position of said stop-unit by slipping said stop-unit through said stop-collar to a predetermined position; and c) retightening said collar-securing means.

20. A method of securing a workpiece in a particular location within a collet, said collet being securable to a rotary collet mount, said method comprising the steps of:

a) inserting a plurality of jaws of a stop-collar in a distal end of a collar-retainer;

b) inserting a plurality of machine-screws into a plurality of through-holes in said distal end of said collar-retainer, each of said through-holes being axially aligned with a threaded hole located in a distal end of said jaws;

c) mating said each of said jaws to said collar-retainer by hand-tightening each of said plurality of machine screws, such that each of said screws matingly engages said threaded hole;

d) loosely threading said collar-retainer into a distal end of said collet;

e) inserting a stop-unit through a stop-collar aperture and a collar-retainer aperture, said collar-retainer aperture being axially aligned with said stop-collar aperture;

f) placing the workpiece at a proximate end of said stop-unit such that the workpiece is located at a desired position; and h) tightening said machine-screws using a mechanical tightening means.

* * * * *